(12) United States Patent
Chikamatsu et al.

(10) Patent No.: US 12,491,829 B2
(45) Date of Patent: Dec. 9, 2025

(54) IN-VEHICLE USE CONTROL SYSTEM

(71) Applicant: Mitsubishi Electric Corporation, Tokyo (JP)

(72) Inventors: Kojiro Chikamatsu, Tokyo (JP); Toshiki Ikegashira, Tokyo (JP); Hiroshi Okuyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 204 days.

(21) Appl. No.: 18/028,279

(22) PCT Filed: Nov. 24, 2020

(86) PCT No.: PCT/JP2020/043581
§ 371 (c)(1),
(2) Date: Mar. 24, 2023

(87) PCT Pub. No.: WO2022/113155
PCT Pub. Date: Jun. 2, 2022

(65) Prior Publication Data
US 2023/0398955 A1    Dec. 14, 2023

(51) Int. Cl.
*B60R 16/02* (2006.01)
*B60R 16/023* (2006.01)
(Continued)

(52) U.S. Cl.
CPC ........ *B60R 16/0232* (2013.01); *G07C 5/0808* (2013.01); *B60W 50/04* (2013.01)

(58) Field of Classification Search
CPC .. B60R 16/0232; G07C 5/0808; B60W 50/04; G06F 11/0739; G06F 11/3013; G06F 11/3055
See application file for complete search history.

(56) References Cited

U.S. PATENT DOCUMENTS

2010/0023207 A1    1/2010   Maeda et al.
2017/0088164 A1*   3/2017   Kobayashi .......... G06F 11/0757
(Continued)

FOREIGN PATENT DOCUMENTS

| CN | 107664983 A | 2/2018 |
|---|---|---|
| JP | 04-268931 A | 9/1992 |

(Continued)

OTHER PUBLICATIONS

Chinese Office Action dated Dec. 5, 2024 in Application No. 202080107153.X.
(Continued)

*Primary Examiner* — Michael V Kerrigan
(74) *Attorney, Agent, or Firm* — Sughrue Mion, PLLC

(57) ABSTRACT

An in-vehicle use control system includes: a state management part which acquires the information on an operational state of the system; a memory storage part which memorizes the information on the operational state of the system, which is acquired by the state management part; a control part which has a plurality of control functions; a list management part which holds lists in which the correspondence relation between the control function of the control part and the normal operating state of the control function is defined; and a monitoring part which chooses the list held in the list management part, based on the operational state which is memorized in the memory storage part, compares the normal operating state of a control function which is defined in the list, and an execution state of the control part, and monitors whether the operation of the control function is normal or not.

10 Claims, 7 Drawing Sheets

(51) Int. Cl.
*G07C 5/08* (2006.01)
*B60W 50/04* (2006.01)

(56) References Cited

U.S. PATENT DOCUMENTS

| | | | |
|---|---|---|---|
| 2017/0190358 A1 | 7/2017 | Kobayashi | |
| 2017/0197655 A1 | 7/2017 | Kobayashi | |
| 2018/0032067 A1* | 2/2018 | Maeda | ............... G05B 23/0221 |
| 2019/0217869 A1* | 7/2019 | Takeuchi | ............ G06F 11/3013 |

FOREIGN PATENT DOCUMENTS

| | | |
|---|---|---|
| JP | 2007-251722 A | 9/2007 |
| JP | 2008-254507 A | 10/2008 |
| JP | 2012-089073 A | 5/2012 |
| JP | 6311827 B2 | 4/2018 |
| WO | 2016/047575 A1 | 3/2016 |

OTHER PUBLICATIONS

Chinese Office Action dated Jun. 29, 2024 in Application No. 202080107153.X.
International Search Report of PCT/JP2020/043581 dated Jan. 12, 2021 [PCT/ISA/210].
Communication dated Dec. 19, 2023, issued in Japanese Application No. 2022-564710.
Chinese Office Action dated Feb. 12, 2025 In Application No. 202080107153.X.

* cited by examiner

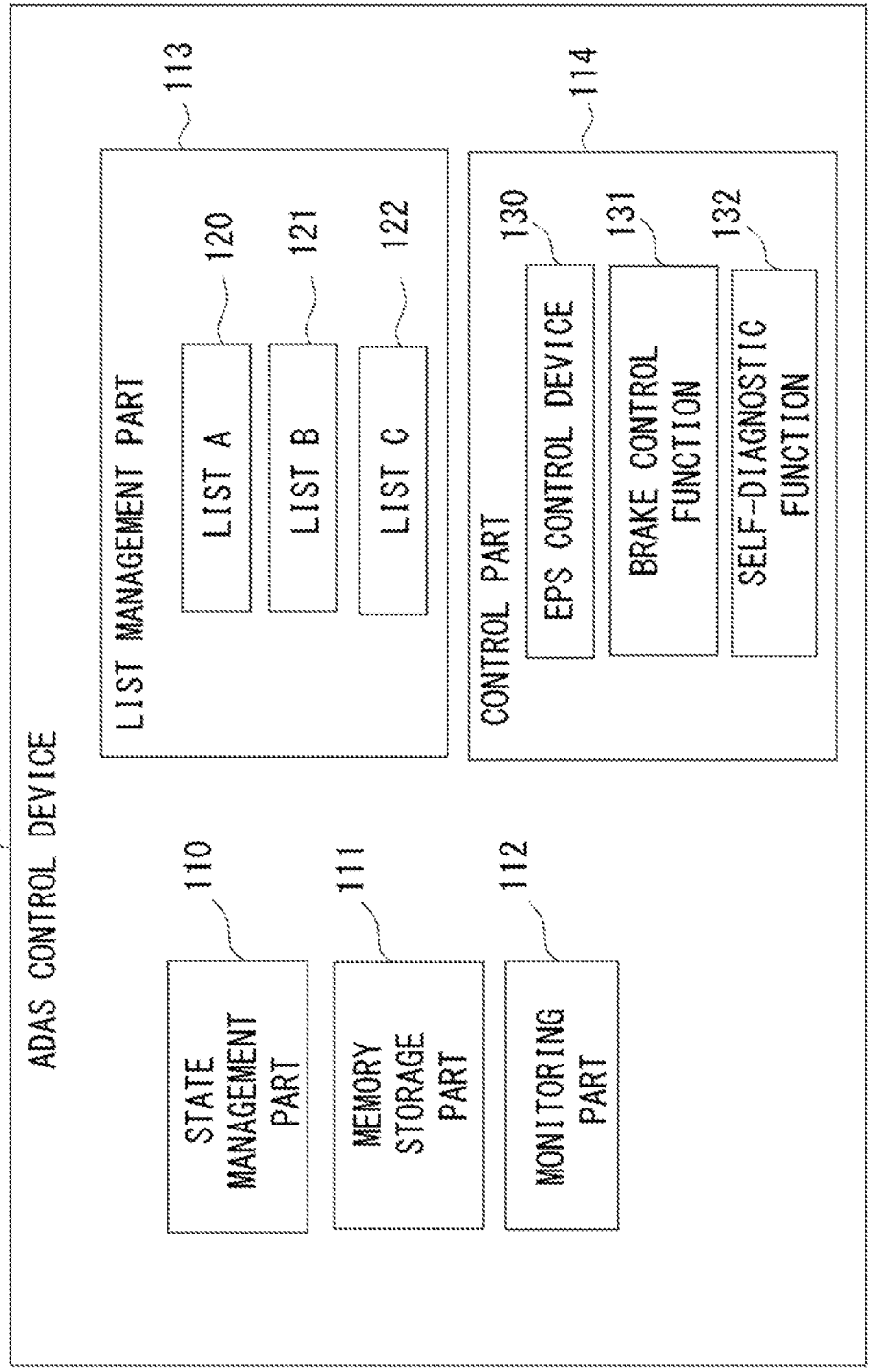

FIG. 2

LIST A (DURING IN-OPERATION)

| CONTROL FUNCTION | THRESHOLD VALUE OF EXECUTION TIME (μs) | EXECUTION SEQUENCE | THRESHOLD VALUE OF NUMBER OF EXECUTIONS (TIMES / 100 ms) |
|---|---|---|---|
| EPS CONTROL FUNCTION | 30 | FUNCTION a → FUNCTION b → FUNCTION c | 7 |
| BRAKE CONTROL FUNCTION | 10 | FUNCTION a → FUNCTION b → FUNCTION c | 9 |
| SELF-DIAGNOSTIC FUNCTION | 20 | FUNCTION a → FUNCTION b | 3 |

LIST B (DURING OUT OF ORDER)

| CONTROL FUNCTION | THRESHOLD VALUE OF EXECUTION TIME (μs) | EXECUTION SEQUENCE | THRESHOLD VALUE OF NUMBER OF EXECUTIONS (TIMES / 100 ms) |
|---|---|---|---|
| EPS CONTROL FUNCTION | 10 | FUNCTION a → FUNCTION b | — |
| BRAKE CONTROL FUNCTION | 10 | FUNCTION a → FUNCTION b → FUNCTION c | 15 |
| SELF-DIAGNOSTIC FUNCTION | 20 | FUNCTION a → FUNCTION b | 3 |

LIST C (DURING DIAGNOSIS)

| CONTROL FUNCTION | THRESHOLD VALUE OF EXECUTION TIME (μs) | EXECUTION SEQUENCE | THRESHOLD VALUE OF NUMBER OF EXECUTIONS (TIMES / 100 ms) |
|---|---|---|---|
| SELF-DIAGNOSTIC FUNCTION | 100 | FUNCTION a → FUNCTION c | — |

FIG. 5

LIST A (DURING USUAL RUN)

| CONTROL FUNCTION | THRESHOLD VALUE OF EXECUTION TIME [μs] | EXECUTION SEQUENCE | THRESHOLD VALUE OF NUMBER OF EXECUTIONS [TIMES / 100 ms] |
|---|---|---|---|
| EPS CONTROL FUNCTION | 30 | FUNCTION a → FUNCTION b → FUNCTION c | 7 |
| BRAKE CONTROL FUNCTION | 10 | FUNCTION a → FUNCTION b → FUNCTION c | 9 |
| SELF-DIAGNOSTIC FUNCTION | 20 | FUNCTION a → FUNCTION b | 3 |

LIST B (DURING USUAL RUN → DURING STOPPAGE)

| CONTROL FUNCTION | THRESHOLD VALUE OF EXECUTION TIME [μs] | EXECUTION SEQUENCE | THRESHOLD VALUE OF NUMBER OF EXECUTIONS [TIMES / 100 ms] |
|---|---|---|---|
| BRAKE CONTROL FUNCTION | 10 | FUNCTION a → FUNCTION b → FUNCTION c | 9 |
| SELF-DIAGNOSTIC FUNCTION | 100 | FUNCTION a → FUNCTION b | — |

LIST C (DURING DEGENERATION RUN → DURING STOPPAGE)

| CONTROL FUNCTION | THRESHOLD VALUE OF EXECUTION TIME [μs] | EXECUTION SEQUENCE | THRESHOLD VALUE OF NUMBER OF EXECUTIONS [TIMES / 100 ms] |
|---|---|---|---|
| BRAKE CONTROL FUNCTION | 10 | FUNCTION a → FUNCTION b → FUNCTION c | 15 |
| SELF-DIAGNOSTIC FUNCTION | 100 | FUNCTION a → FUNCTION b | — |

IN-VEHICLE USE CONTROL SYSTEM

CROSS REFERENCE TO RELATED APPLICATIONS

This application is a National Stage of International Application No. PCT/JP2020/043581 filed on Nov. 24, 2020.

FIELD OF THE INVENTION

The present application relates to the field of an in-vehicle use control system.

BACKGROUND OF THE INVENTION

In a vehicle, control devices, each of which is called an ECU (Electronic Control Unit), are mounted, and each of the ECUs is connected to a network which can perform wired or wireless communications.

When wired or wireless communications means and a network of communication linkage fall into an unusual state for a certain reason, and the control program of an ECU performs unusual processing, the user of a vehicle will suffer from an unintended disadvantage.

With the adoption of automatic steering control in a vehicle, a high degree of operational reliability has been required increasingly. In accordance with this requirement, in-vehicle control systems need to monitor execution states in the control, to eliminate unusual conditions.

In the Patent Document 1, a technology is proposed in the control of an in-vehicle use electronic device, where the execution state of a control program of the in-vehicle use electronic device is monitored. Even in a case where an unusual execution state is detected in the control program, in order to continue the control of the in-vehicle use electronic device, this technology is provided with an execution time monitoring timer circuit, linked to the control device of the in-vehicle use electronic device; an execution sequence monitoring circuit; and a program execution monitoring circuit of exclusive use, consisting of a setting register and other attached circuits and the like. The technology monitors the execution sequence of tasks which the control program of the in-vehicle use electronic device performs, and/or the execution time for performing from a head address to an end address of a task, which the control program performs. When an abnormality is detected in the execution sequence and/or the execution time, an alternative processing is performed, to continue the control of the in-vehicle use electronic device.

CITATION LIST

Patent Literature

Patent Document 1: Japanese Patent No. 6311827

SUMMARY OF THE INVENTION

Technical Problem

According to the technology proposed in the Patent Document 1, in order to distinct the case where the execution state of a program is normal, from the case where the execution state is unusual, the operation of the program in the normal case is registered beforehand, and the operation under execution is compared with the registered operation. If there is an operation which fulfills the conditions or agrees with, among registered operations, it will be judged that the operation is normal, and if there is nothing which is in agreement with, it will be judged that the operation is unusual.

However, in the in-vehicle use electronic device, the execution state of a program changes, corresponding to the change in the state of a vehicle. Thereby, various operations in a plurality of states are registered beforehand, and operations under execution and all the registered operations are compared. Therefore, the presence or absence of abnormalities in the operation is monitored, and then, there arises a problem that the monitoring becomes redundant.

The present application is made in order to reduce the problems which are mentioned above, and aims at offering an in-vehicle use control system which is capable of suppressing the redundancy in monitoring.

Solution to Problem

An in-vehicle use control system according to the present application includes:
- a state management part which acquires information on an operational state of the system,
- a memory storage part which memorizes the information on the operational state of the system which is acquired by the state management part,
- a control part which has a plurality of control functions,
- a list management part which holds lists in which a correspondence relation between the control function of the control part and a normal operating state of the control function is defined, and
- a monitoring part which chooses the list held in the list management part, based on the operational state memorized in the memory storage part, compares the normal operating state of the control function which is defined in the list with an execution state of the control part, and monitors whether the operation of the control function is normal or not.

Advantageous Effects of Invention

According to the in vehicle control system of the present application, redundant monitoring can be suppressed by choosing the list which compares an execution state, according to the state where the in-vehicle control system is placed.

BRIEF EXPLANATION OF DRAWINGS

FIG. 1 is a block diagram showing the constitution of an in-vehicle control system in accordance with the Embodiment 1 of the present application FIG. 2 is an explanatory diagram of the lists which define control functions and the normal operating states of the control functions, in accordance with the Embodiment 1 of the present application.

FIG. 5 is an explanatory diagram of the lists which define control functions and the normal operating states of the control functions, in accordance with the Embodiment 2 of the present application.

DESCRIPTION OF EMBODIMENTS

Figure 3:
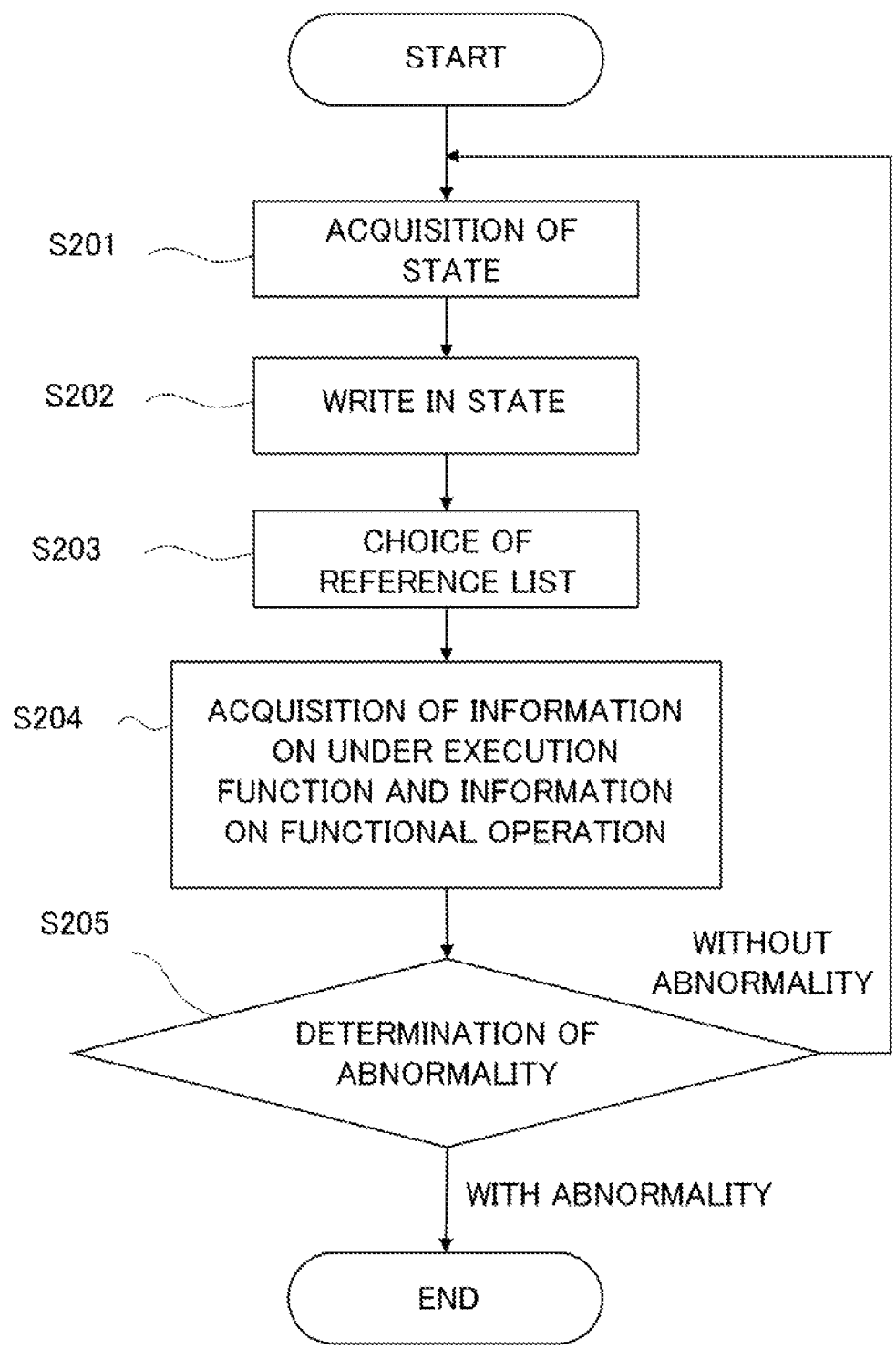
FIG. 3 is a flow diagram showing the procedures of monitoring processing in accordance with the Embodiment 1 of the present application.

Hereinafter, explanation will be made, using drawings, about the Embodiments of an in-vehicle control system in accordance with the present application. It is worth noticing that, the same symbols in each of the Embodiments show the same or corresponding portions, and overlapping explanation will be omitted thereabout.

Embodiment 1

As the in-vehicle control system, an ADAS (Advanced Driver Assistance System) control device is taken up, to make an explanation about it.

FIG. 1 is a drawing showing an example of the constitution of the ADAS control device in accordance with the Embodiment 1. The ADAS control device 100 is equipped with a state management part 110, a memory storage part 111, a monitoring part 112, a list management part 113, and a control part 114. Moreover, the list management part 113 is equipped with lists (list A 120, list B 121, and list C 122). The control part 114 is equipped with, as control functions, an EPS (Electric Power Steering) control function 130, a brake control function 131, and a self-diagnostic function 132. In addition, the constitution which is shown in FIG. 1 is an example, and as long as the control device is equipped with the state management part 110, the memory storage part 111, the monitoring part 112, the list management part 113, and the control part 114, the control device may not necessarily be the same as that shown in FIG. 1.

Hereinafter, each of the compositions of the ADAS control device 100 and its function will be explained.

The state management part 110 expresses, by numerical values, the state where the ADAS control device 100 is placed (operational state), acquires a numerical value according to the state, and writes in the acquired value to the memory storage part 111. Namely, the ADAS control device 100 is an ECU, for example. Additionally, the state where the ADAS control device 100 is placed is, for example, during initialization, during in operation, during out of order, during diagnosis, and the like.

Therefore, the state management part 110 will determine the operational state based on the state of the in-vehicle control system (ADAS control device 100).

The memory storage part 111 memorizes the value which the state management part 110 acquired, and indicates the state where the ADAS control device 100 is placed. Additionally, the memory storage part continues holding the memory until a new value is written in.

The monitoring part 112 chooses a list to be referred (the list A 120, the list B 121, and the list C 122), from the list management part 113, based on the state where the ADAS control device 100 is placed, which is memorized in the memory storage part 111. Moreover, the monitoring part 112 acquires the function which is under execution in the control part 114 of the ADAS control device 100 (the EPS control function 130, the brake control function 131, and the self-diagnostic function 132) and the information relevant to the operation of the function. Additionally, the monitoring part compares whether the function and operation which fulfill the conditions in the referring list are performed. Main factors to be compared are, for example, the execution time of the function, the execution sequence, and the number of executions in a predetermined period of time.

The list management part 113 holds the lists (the list A 120, the list B 121, and the list C 122) each of which corresponds to each of the states, and offers a list according to the demand from the monitoring part 112. As the split unit of the holding lists, a state which is acquired at the state management part 110 may be allowed to be employed, or the lists may be divided in functional unit so that the monitoring unit 112 refers to a plurality of lists for each of the states.

Using FIG. 2, explanation will be made about the constitution of a plurality of lists (the list A 120, the list B 121, and the list C 122) which the list management part 113 in accordance with the present Embodiment 1 holds.

As shown in FIG. 2, in the list A 120, the list B 121, and the list C 122, control functions of the control part 114 (the EPS control function 130, the brake control function 131, and the self-diagnostic function 132) and normal operations of the control functions are written in, which become the targets for monitoring.

In the list A 120, the list B 121, and the list C 122, items are set as factors to judge that the operating state of a control function is normal. Those items are: "control function" in a normal case, "threshold value of the execution time," "execution sequence," and "threshold value of the number of executions" in a predetermined period of time, and the like. Those items are optional, and other items may be allowable, as long as they are the items which can specify the operation of a program.

As for the "threshold value of the execution time," a time from the start of the execution of a function to the end of the execution is called an execution time. In addition to the execution time, the processing delay and the like, which may occur by the interruption of a high priority function, will be considered. Those in mind, the threshold value of the execution time is set up by designers or learning algorithm. Moreover, even if the same functions are dealt with, the threshold value of the execution time to be set up will change, depending on the state where a vehicle is placed, in the case where the processing which will not be performed is included, or in the case where the delay of a processing is not allowed. For example, as for the EPS control function, in the state where the control function is during in-operation, the processing for automatic steering is performed. However, in the state where the control function is during out of order, it is dangerous to leave the steering to a system. Then, the processing for automatic steering is suspended, and switching to the manual steering by a driver is carried out. In this case, during out of order or during in operation, the execution time will change due to the presence or absence of the automatic steering processing.

The "execution sequence" is defined as an order of processes which are performed within a function. Additionally, for example, the execution sequence may be an order of the function to be performed, and may be an order of addresses of the command to be executed. Moreover, even if the same functions are dealt with, the execution sequence to be set up will change in the case where the processing to be performed only in a specific state is included, or in the case where the order of the processing to be performed changes according to a state, or the like. For example, as for the self-diagnostic function, in the state where a vehicle is during in operation, priority is given to the function relevant to the control of the vehicle over a self-diagnostic function.

Therefore, regarding the processing with large amounts of used resources, or the processing with large processing load, the self-diagnostic function is not performed in the state where the vehicle is during in operation, but performed only in the state where the vehicle is during diagnosis. In this case, the execution sequence changes in the state where the vehicle is during in-operation or during diagnosis.

In the control function which is activated periodically, the "threshold value of the number of executions" in a predetermined period of time sets up the minimum number of executions which are performed during a predetermined period of time. Moreover, even if the same control functions are dealt with, the threshold value of the number of executions in a predetermined period of time will change in the case where, according to a state, periodic activation is not performed, or in the case where, due to the change in the priority of control functions, the timing of activation changes, or the like. For example, in the self-diagnostic function, when the state of the vehicle is during in operation or during out of order, the minimum processing is performed by periodic activations. Then, the in-vehicle use control system monitors whether control functions are activated correctly, by monitoring the number of executions in a predetermined period of time. However, when the state of the vehicle is during diagnosis, a diagnostic tool is connected from the outside, and the in-vehicle use control system performs functions, making the diagnostic execution signal which is transmitted from the diagnostic tool as a trigger. Therefore, the number of executions in a predetermined period of time cannot be monitored.

As shown in FIG. 2, the split unit of the lists which are memorized in the list management part 113 is made to correspond to the state which is acquired by the state management part 110. When the state of the vehicle is during in-operation, the monitoring part 112 refers to the list A 120 from the list management part 113, and monitors only the control functions and the operation of these control functions, which are written in the list A 120.

The control part 114 is equipped with a plurality of control functions (the EPS control function 130, the brake control function 131, and the self-diagnostic function 132) for controlling the ADAS control device 100.

Next, explanation will be made, using FIG. 3, about a series of procedures of the monitoring processing of the ADAS control device 100 in accordance with the Embodiment 1.

In FIG. 3 and in Step S201, the state management part 110 acquires a value which indicates the state where the ADAS control device 100 is placed. As for the timing of acquiring the value, it is allowed to acquire it at a predetermined cycle, or to acquire it every time the state changes.

Subsequently, in Step S202, the state management part 110 writes in the value which indicates the state acquired in Step S201, to the memory storage part 111. The memory storage part 111 memorizes the written in value, until the state management part 110 acquires newly a value which indicates a state, and writes it in.

In Step S203, the monitoring part 112 chooses a list, which is to be referred from the list management part 113 (the list A 120, the list B 121, and the list C 122), based on the state which is memorized in the memory storage part 111. In concrete words, in FIG. 2, when a value which indicates that the state is during in-operation is memorized in the memory storage part 111, the monitoring part 112 refers to the list A 120.

Subsequently, in Step S204, the monitoring part 112 acquires, from the control part 114, a control function under execution (the EPS control function 130, the brake control function 131, and the self-diagnostic function 132) and the information relevant to the operation of the control function.

In Step S205, the monitoring part 112 compares the list chosen in Step S203, with the control function under execution and the information relevant to the operation of the control function which is acquired in Step S204. Thereby, the monitoring part judges whether the control function under execution is normal or unusual. In concrete words, the monitoring part compares at first whether the control function under execution acquired is indicated in the list which is referred to. When the control function under execution is described in the list, the monitoring part compares the operation of the control function under execution with the normal operation of the control function on the list. When all the conditions are fulfilled, the monitoring part judges that the operation is normal, and when even one item does not fulfill the conditions, the monitoring part judges that the operation is unusual.

In Step S205, when the control function under execution is judged to be normal (without abnormalities), the monitoring processing will be repeated.

In Step S205, when the control function under execution is judged to be unusual (with abnormalities), the monitoring processing will be ended. After the monitoring processing is ended, using the list which is referred to in the monitoring processing, the information on the state of the ADAS control device 100 at the time of unusual detection, and the information on the control function and the operation judged to be unusual, may be passed to a function or a module or the like, which performs treatment after detecting an abnormality.

In this way, according to the in-vehicle control system in accordance with the present Embodiment 1, the control function and the operation of the in-vehicle control system can be monitored, which correspond to the state of the ADAS control device 100.

Furthermore, according to the state of the ADAS control device 100, the in-vehicle control system can monitor only the control function which needs monitoring. Then, redundant monitoring can be suppressed.

Furthermore, with respect to the control function whose operation changes according to the state of the ADAS control device 100, the normal operation of a control function can be defined for each of the states. Thereby, the tolerance level of the threshold values is stopped to spread, the normal operation of a control function can be defined more strictly, and security tolerance can be improved.

Furthermore, from the information on the state of the ADAS control device 100 at the time of unusual detection, the information on the control function and the information of the operation judged to be unusual, it is possible to identify the location of abnormality and the spillover point of abnormality. Moreover, by using the specified information, the present application can tie to the treatment and analysis after detecting an abnormality.

Embodiment 2

Next, explanation will be made, based on FIG. 4 to FIG. 6, about an ADAS control device in accordance with the Embodiment 2.

Figure 4:
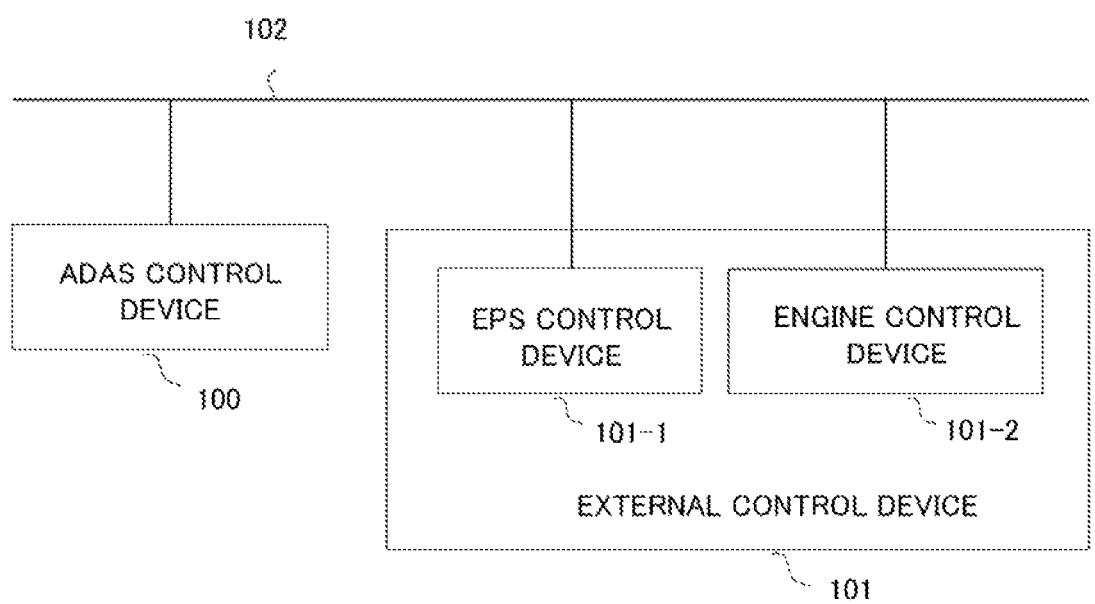
FIG. 4 is a block diagram showing the constitution of the control device in accordance with the Embodiment 2 of the present application.

FIG. 4 is a drawing showing an example of the constitution of the ADAS control device in accordance with the Embodiment 2. The ADAS control device 100 is connected with an EPS control device 101-1 and an engine control device 101-2, of the external control device 101, both through an in-vehicle network 102. The in-vehicle network 102 includes CAN (Controller Area Network), Ethernet, and the like, but not restricted to them. Moreover, also about the network architecture, the constitution which is shown in FIG. 4 is an example. As long as the ADAS control device 100 and the external control device 101 are connected with the communication line which can transmit information on the system, any form of the system will be allowable.

Moreover, the ADAS control device 100 has the same constitution which is shown in FIG. 1. The ADAS control device 100 is constituted of and equipped with, a state management part 110, a memory storage part 111, a monitoring part 112, a list management part 113, and a control part 114. Moreover, the state management part 110 is equipped with a list A 120, a list B 121, and a list C 122, and the control part 114 is constituted of and equipped with, an EPS control function 130, a brake control function 131, and a self-diagnostic function 132. It is worth noticing that, the constitutions shown in FIG. 1 and FIG. 4 are examples. As long as the control device is equipped with a state management part 110, a memory storage part 111, a monitoring part 112, a list management part 113, and a control part 114, and further, is connected through one or more external control devices 101, through an in vehicle network 102, the constitution is not necessarily the same as those in FIG. 1 and FIG. 4.

The present Embodiment 2 is different from the Embodiment 1 in that, the ADAS control device 100 is connected, through the in vehicle network 102, with the EPS control device 101-1 and the engine control device 101-2, of the external control device 101. The external control device 101 can be an ECU, for example, or the equipment which has a sensing function.

Hereinafter, differences from the Embodiment 1 will be briefly explained, about each component of the ADAS control device 100 and its function.

In addition to the value indicating the state which the ADAS control device 100 has, the state management part 110 acquires, via the in-vehicle network 102, sensor values or out of order information or the like, of the EPS control device 101-1 and the engine control device 101-2. Sensor values include, for example, vehicle speed, steering angle, engine speed, and the like.

Based on the acquired values and information, the state management part 110 determines the value corresponding to the present state of the vehicle, and writes in the value which indicates the present state of the vehicle, to the memory storage part 111. The state of the vehicle includes, for example, during the stoppage of a vehicle, during the usual run of a vehicle, during the degeneration run of a vehicle, during the diagnosis of a vehicle, and the like.

The memory storage part 111 memorizes the value which is determined by the state management part 110, indicating the present state of the vehicle, and the memory is held and maintained until a new value is written in. Moreover, when the state of the vehicle changes during a predetermined period of time, and the state management part 110 determines a new state which is different from the previous one, the memory storage part does not overwrite the value before the change of a state. Additionally, combining the value before the change of a state, the memory storage part memorizes the value which indicates a new state, as a state transition in a predetermined period of time.

The predetermined period of time is set up to be in the range, where a difference may be produced in the state of the vehicle which the state management part 110 determined, by the state transition of that period of time. For example, in the case where the present state of a vehicle is determined to be during stoppage, required control function and the monitoring which will be needed according to the control function become different, depending on whether the last state is during usual run or during degeneration run. Thereby, even if the states of the vehicle are the same during stoppage, each of the present states is regarded as the different state of the vehicle.

The monitoring part 112 chooses a list to be referred, from the list management part 113 (the list A 120, the list B 121, and the list C 122), based on the state which is memorized in the memory storage part 111. The monitoring part 112 may choose the list, based on the present state of a vehicle which the memory storage part 111 memorizes, or based on the state transition in a predetermined period of time.

The list management part 113 keeps a plurality of lists (the list A 120, the list B 121, and the list C 122) in memory, and offers a list according to the demand from the monitoring part 112. As for the split unit of the lists which are kept in memory, the lists may be divided by the present state of a vehicle memorized in the memory storage part 111, or by the state of the vehicle based on the state transition in a predetermined period of time, or by function unit. The list management part is allowed to refer to a plurality of lists for each of the states of the vehicle.

Using FIG. 5, explanation will be made about the constitution of a plurality of lists (the list A 120, the list B 121, and the list C 122) which is memorized in the list management part 113 in accordance with the Embodiment 2.

As shown in FIG. 5, regarding the state which is memorized in the memory storage part 111, or the state transition in a predetermined period of time, the list A 120, the list B 121, and the list C 122 describe the functions of the control part 114 which become the targets for monitoring (the EPS control function 130, the brake control function 131, and the self-diagnostic function 132) and the normal operations of the functions. FIG. 5 shows examples of the list A 120, the list B 121, and the list C 122, and they are not necessarily the same as those in FIG. 5.

As shown in FIG. 5, when the present state of the vehicle which is memorized in the memory storage part 111 is during stoppage, and the past state before the change in a predetermined period of time is during usual run, the monitoring part 112 refers to the list B121 from the list management part 113, and monitors only functions and the operation of these functions, written in the list B121.

Next, using FIG. 6, explanation will be made about a series of flows in the monitoring processing of the ADAS control device 100, in accordance with the Embodiment 2.

Figure 6:
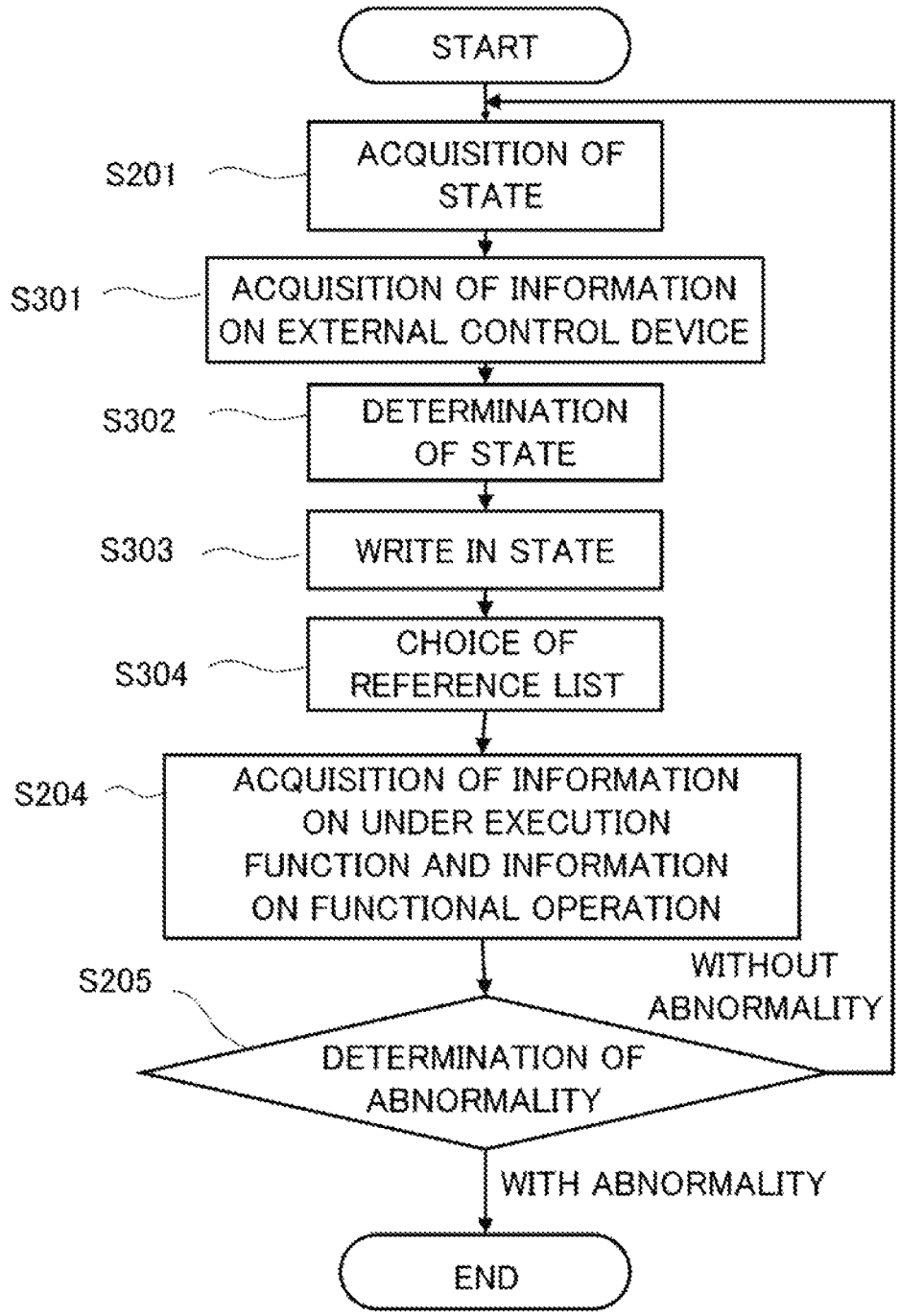
FIG. 6 is a flow diagram showing the procedures of the monitoring processing in accordance with the Embodiment 2 of the present application.

In FIG. 6 and in Step S201, the state management part 110 acquires the value indicating a state which the ADAS control device 100 has. As for the timing of acquiring a value, it is allowed to acquire it at a predetermined cycle, or to acquire it every time the state changes.

Subsequently, in Step S301, the EPS control device 101-1 and the engine control device 101-2 transmit their own sensor values, or out of order information, or the like, to the ADAS control device 100, via the in-vehicle network 102, and the ADAS control device 100 receives them.

In Step S302, the state management part 110 determines the present state of the vehicle, based on the value which indicates the state acquired in Step S201, and the communication data (sensor values, or out of order information, or the like) received in Step S301, from the EPS control device 101-1 and the engine control device 101-2.

Subsequently, in Step S303, the state management part 110 writes in the present state of the vehicle which is determined in Step S302, to the memory storage part 111. The memory storage part 111 memorizes the written in value until the state management part 110 acquires newly a value which indicates a state, and writes it in. Or, when, during a predetermined period of time, acquiring a new state and writing it in, the memory storage part does not overwrite the value before the change of a state. Additionally, combining the value before the change of a state, the memory storage part memorizes the value which indicates a new state, as a state transition in a predetermined period of time. Step S303 differs from Step S202 of FIG. 3, in that the memory storage part memorizes not only the present state of the vehicle, but the past state transition of the operational state in a predetermined period of time.

In Step S304, the monitoring part 112 chooses the list to be referred (the list A 120, the list B 121, and the list C 122), from the list management part 113, based on the state which is memorized in the memory storage part 111. In concrete words, in FIG. 5, when the value which indicates that a vehicle is during stoppage is memorized in the memory storage part 111, and moreover, when, as a just before state of the vehicle in a predetermined period of time, the value which indicates that the vehicle is during usual run is memorized, the monitoring part 112 refers to the list B121. Step S304 differs from Step S203 of FIG. 3, in that the list to be referred is chosen based on not only the present state of the vehicle, but also based on the past state transition of operational state in a predetermined period of time.

Subsequently, in Step S204, the monitoring part 112 acquires, from the control part 114, the control function under execution (the EPS control function 130, the brake control function 131, and the self-diagnostic function 132) and information relevant to the operation of the control function.

In Step S205, the monitoring part 112 compares the list which is chosen in Step S304, with the control function under execution and the information relevant to the operation of the control function, which are acquired in Step S204. Thereby, the monitoring part judges whether the control function under execution is normal or unusual. In concrete words, the monitoring part compares at first whether the acquired control function under execution is descried in the list which is under reference. When the control function under execution is described in the list, the monitoring part compares the operation of the control function under execution with the normal operation of the control function in the list. Additionally, when all the conditions are fulfilled, the monitoring part judges that the operation is normal, and when even one condition is not fulfilled, the monitoring part judges that the operation is unusual.

In Step S205, when the control function under execution is judged to be normal (without abnormalities), monitoring processing will be repeated.

In Step S205, when the control function under execution is judged to be unusual (with abnormalities), monitoring processing will be ended. After the monitoring processing is ended, using the list which is referred to in the monitoring processing, the state of the vehicle at the time of unusual detection, the state transition, the information on the control function and operation judged to be unusual, may be passed to a function or a module or the like, which performs the treatment after detecting an abnormality.

In this way, according to the in-vehicle control device in accordance with the present Embodiment 2, the control function of the in-vehicle control device and the operation of the control function can be monitored according to the state of the vehicle.

Furthermore, since the state of the vehicle is determined not only by the present state of the vehicle, but also in consideration of the past state transition of the operational state in a predetermined period of time, the state of the vehicle can be defined in detail.

Moreover, according to the state of the vehicle, the in-vehicle control device can monitor only the control function which needs monitoring. Thereby, redundant monitoring can be suppressed.

Furthermore, with respect to the control function whose operation changes according to the state of the vehicle, the normal operation of the control function can be defined for each of the states. Thereby, the tolerance level of a threshold value is stopped to spread, the normal operation of the control function can be defined more strictly, and security tolerance can be improved.

Furthermore, from the state of a vehicle at the time of unusual detection, the state transition, the control function and operation judged to be unusual, it is possible to identify the location of abnormality and the spillover point of abnormality. Moreover, by using the specified information, the present application can tie to the treatment and analysis after detecting an abnormality.

Figure 7:
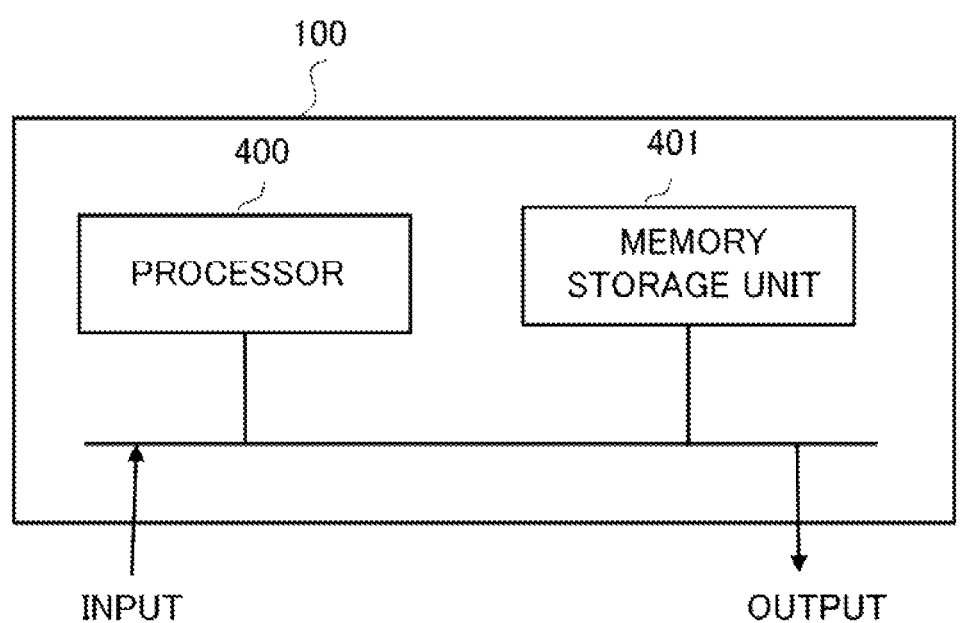
FIG. 7 is a constitution diagram showing an example of the hardware of in-vehicle control systems in accordance with the Embodiment 1 and the Embodiment 2 of the present application.

It is worth noticing that, the ADAS control device 100 consists of a processor 400 and a memory storage unit 401, as an example of the hardware is shown in FIG. 7. Although not illustrated, the memory storage unit is equipped with volatile storage units, such as random access memories, and non-volatile auxiliary storage units, such as flash memories. Moreover, instead of flash memories, the memory storage unit may be provided with an auxiliary storage unit of hard disk type. The processor 400 executes a program which is input from the memory storage unit 401. In this case, the program is input into the processor 400 through a volatile storage unit from an auxiliary storage unit. Moreover, the processor 400 may output the data of operation results and others to the volatile storage unit of the memory storage unit 401, and may save the data through the volatile storage unit in the auxiliary storage unit.

Although the present application is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments. It is therefore understood that numerous modifications which have not been exemplified can be devised without departing from the scope of the present application. For example, at least one of the constituent components may be modified, added, or eliminated. At least one of the constituent components mentioned in at least one of the preferred embodiments may be selected and combined with the constituent components mentioned in another preferred embodiment.

EXPLANATION OF NUMERALS AND SYMBOLS

100 ADAS Control Device: 101 External Control Device: 101-1 EPS Control Device: 101-2 Engine Control Device: 102 In-Vehicle Network: 110 State Management Part: 111 Memory Storage Part: 112 Monitoring Part: 118 List Management Part: 114 Control Part: 120 List A: 121 List B: 122 List C: 130 EPS Control Function: 131 Brake Control Function: 132 Self-Diagnostic Function: 400 Processor: 401 Memory Storage Unit

What is claimed is:

1. An in-vehicle use control system, comprising:
a memory for storing instructions and at least one processor configured to implement those instructions:
a retriever which acquires information on an operational state of the system,
a memory part which stores the information on the operational state of the system which is acquired by the retriever,
a controller which has a plurality of control functions,
a list holder which stores lists in which a correspondence relation between the control function of the controller and a normal operating state of the control function is defined, and
a monitor which chooses one of the lists stored in the list holder, based on the operational state stored in the memory part, compares the normal operating state of the control function which is defined in the list with an execution state of the controller, and monitors whether the operation of the control function is normal or not.

2. The in-vehicle use control system according to claim 1, wherein, on the list, a threshold value of an execution time of the control function is set as a factor to judge that the operating state of the control function is normal.

3. The in-vehicle use control system according to claim 1, wherein, on the list, an execution sequence of the control function, in a normal case, is included as a factor to judge that the operating state of the control function is normal.

4. The in-vehicle use control system according to claim 1, wherein, on the list, a threshold value of a number of executions of the control function in a predetermined period of time, in a normal case, is included as a factor to judge that the operating state of the control function is normal.

5. The in-vehicle use control system according to claim 1, wherein the retriever determines the operational state based on the acquired information on the operational state of the system.

6. The in-vehicle use control system according to claim 1, wherein the retriever acquires communication data from an external control device which is different from the controller, and determines the operational state using the communication data.

7. The in-vehicle use control system according to claim 1, wherein the monitor stores the operational state which is acquired by the retriever, and a past state transition of the operational state in a predetermined period of time.

8. The in-vehicle use control system according to claim 7, wherein the monitor chooses the list, further based on the past state transition of the operational state in a predetermined period of time.

9. The in-vehicle use control system according to claim 1, wherein the list holder stores the list for every operational state which is stored in the memory part.

10. The in-vehicle use control system according to claim 1, wherein the system is mounted in a vehicle, and the operational state which is acquired by the retriever is the state of the vehicle.

\* \* \* \* \*